June 29, 1954
A. L. HAMILTON
2,682,129
DEPTH INDICATOR FOR FISHING BOBBERS
Filed June 1, 1951
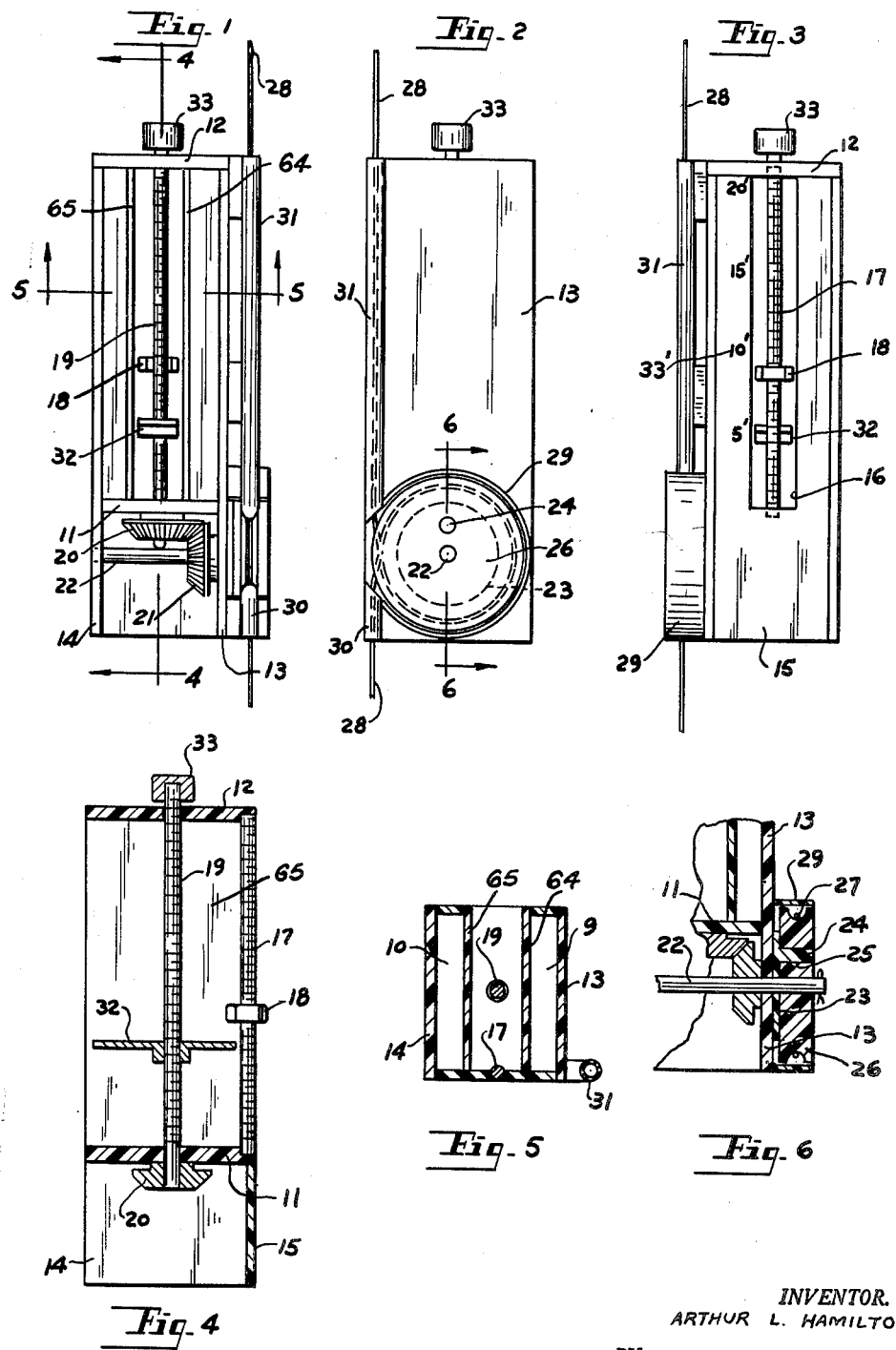
INVENTOR.
ARTHUR L. HAMILTON.
BY
*Thos. L. Donnelly*
ATTORNEY.

Patented June 29, 1954

2,682,129

UNITED STATES PATENT OFFICE 2,682,129

DEPTH INDICATOR FOR FISHING BOBBERS

Arthur L. Hamilton, Fenton, Mich.

Application June 1, 1951, Serial No. 229,469

1 Claim. (Cl. 43—43.1)

My invention relates to a new and useful improvement in a depth indicator for fishing bobbers used on fishing lines. Frequently fishermen desire, when casting, to use a bobber. Under such conditions the bobber must be such that as the line is reeled in the bobber will be moved to adjacent the end of the line, so that when the casting is done the bobber and the hook and sinker are all cast outwardly as one unit. It is common practice to tie a knot in the line so that when the cast has been made the hook and sinker will sink downwardly, leaving the bobber on the surface and the line being drawn through the bobber until the knot engages the bobber. This is not an efficient apparatus due to the fact that the knot interferes both with reeling in and out casting.

It is an object of the present invention to provide a fishing bobber so arranged and constructed that it may be mounted on the fishing line in such a manner that when the line is reeled in the bobber will be moved to adjacent the end of the line carrying the hook and sinker and when the cast is made the bobber will remain afloat, permitting the hook and sinker to sink to a predetermined depth.

It is another object of the invention to provide a bobber of this type which may be easily and quickly mounted on the fishing line and which will not interfere with the operation of the reel either in reeling in or in making a cast.

It is another object of the invention to provide a bobber of this class so arranged and constructed that it may be adjusted to permit the fish hook to sink to a predetermined or adjusted depth.

Other objects will appear hereinafter.

It is recognized that various modifications and changes may be made in the detail of the structure illustrated without departing from the invention and it is intended that the present disclosure shall be considered but the preferred embodiment.

Forming a part of this application are drawings in which:

Fig. 1 is a rear elevational view of the invention;

Fig. 2 is a side elevational view of the invention;

Fig. 3 is a front elevational view of the invention;

Fig. 4 is a sectional view taken on line 4—4 of Fig. 1;

Fig. 5 is a sectional view taken on line 5—5 of Fig. 1; and

Fig. 6 is a fragmentary sectional view taken on line 6—6 of Fig. 2.

As shown in the drawings I provide a pair of buoyant bodies 9 and 10 in spaced-apart relation to each other and connected together by a lower plate 11 and an upper plate 12. These bodies 9 and 10 are hollow and preferably formed from plastic or rubber. The outer walls 13 and 14 of these bodies are extended below the bottom plate 11. A front plate 15 is mounted on the side walls 13 and 14 and are of the same length as these side walls. Formed in this front plate 15 is a slot 16. Mounted at its opposite ends in the bottom plate 11 and the top plate 12 is a threaded rod or stud 17, on which is threaded a nut 18 and which is accessible through the slot 16 so that the fisherman may easily move the nut 18 longitudinally of the rod or stud 17. Extended through the bottom plate 11 and the top plate 12 is a threaded rod or stud 19 fixedly mounted to which, below the bottom plate 11, is a bevel gear 20, meshing with a bevel gear 21 which is fixedly mounted on the shaft 22 journaled in the oppositely disposed plates 14 and 13 and projecting through the plate 13, as clearly shown in Fig. 6. Fixedly mounted on the shaft 22 at the outside of the plate 13 is a disc 23, so that this disc 23 rotates in unison with the shaft 22. Extending outwardly from the disc 23 is a stud 24, extending through a passageway 25 formed eccentrically in the sheave or pulley 26, the pulley being formed with a peripheral groove 27 in which the fish line 28 may travel. This pulley is mounted in an enclosing housing 29, open at one end so that the line may pass from the housing into a tube 30, which is mounted on the side plate 13. Mounted on this side plate 13 adjacent one end is a tube 31, which terminates at the opening in the housing 29. Thus the fishing line is guided downwardly toward the opening of the housing and wound around the pulley or sheave 26 and then passed downwardly through the tube 30. After being passed through the tube 30 the hook and sinker would be connected to the fishing line.

Mounted between the buoyant housings 9 and 10 is an engagement plate 32 through which the threaded stud or rod 19 is threaded. Fixedly mounted on this member 19 is a knob 33 whereby the user may manually rotate the stud or rod 19. The plate 32 will be prevented from rotating by engagement with the walls 64 and 65.

Displayed on the face of the front face 15 are numerals as at 33' to indicate the depth. This engagement member 32 underlies the nut 18 so that when the rod or stud 19 is rotated a predetermined number of turns the engagement member 32 will come into engagement with the nut 18, which serves as an abutment member. In use, before the line is passed around the sheave or pulley 26, the member 19 would be rotated so that the engagement member 32 would rest upon the bottom plate 11 which would be in what may be termed a neutral position. After passing the line around the pulley and tieing the sinker and hook thereto, the line, as it is drawn downwardly, will cause a rotation of this pulley or sheave 26 which will in turn, through a rotation of the bevel gears 21 and 20, effect a rotation of the stud 19 causing the member 32 to travel upwardly. Should nut 18 be moved to a position indicating 5', 5' of the line would be drawn up before the engagement member would engage the abutment or nut 18. Likewise should the nut be adjusted to any of the other desired positions, such as 10', 15' or 20', the line would have to be drawn up 10', 15' or 20' in order to effect a travel of the engagement member 32 a sufficient distance for engaging the nut 18. In use the hook and sinker would continue to sink and draw the line downwardly and rotate the sheave or pulley 26 until the engagement member 32 engages the nut 18 and thereupon the hook and sinker would be prevented from sinking deeper. Thus there is a means for adjusting the depths of the hook as the bobber will always float on the surface. This is quite desirable because it is necessary to fish in the proximity of the depth at which the fish are located.

A fisherman, after making several casts at one depth, may easily and quickly, by adjusting the position of the nut 18, adjust his fishing line for fishing at a different depth.

Experience has shown that this invention is one which is highly efficient in use and it is to be noted that there are no knots or other obstacles on the line to interfere either with the reeling in or the casting out. The structure may be made as sufficiently light and compact as the conventional type of bobber.

What I claim is:

A fishing bobber comprising a buoyant housing having a wall at one end thereof and a partition intermediate the ends thereof; a threaded shaft having bearings in said wall and partition and extending therethrough; a knob on one end of the shaft for manually rotating said shaft; an engagement plate threaded on said shaft; a threaded member fixed in the housing, extending longitudinally thereof and parallel to the threaded shaft; a stop adjustably mounted on the threaded member; a pulley shaft at a right angle to the threaded member having bearings in the housing and provided with a pulley at one end thereof, said pulley having a recessed peripheral edge; gearing between the threaded shaft and the pulley shaft; line guide members in alignment along one edge of the housing and in spaced relation adjacent one end thereof at a locus substantially in the plane of the peripheral edge of the pulley, the space providing an access opening for the hand of an operator to direct the line to and from the recess around the pulley, movement of the line being effective to rotate the pulley and cause the plate to engage the stop, manipulation of the knob being adapted to adjust the plate relative to the shaft; and a disc fixed to the pulley shaft and provided with an eccentric stud, said pulley having an opening to receive the stud whereby rotation of the pulley will cause rotation of the shaft.

References Cited in the file of this patent

UNITED STATES PATENTS

| Number | Name | Date |
| --- | --- | --- |
| 2,177,697 | Fairbanks | Oct. 31, 1939 |
| 2,497,356 | Hagen | Feb. 14, 1950 |
| 2,512,514 | Adell | June 20, 1950 |
| 2,531,940 | Kirshman | Nov. 28, 1950 |